(12) United States Patent
Takenobu

(10) Patent No.: US 7,519,848 B2
(45) Date of Patent: Apr. 14, 2009

(54) DATA TRANSFER APPARATUS

(75) Inventor: Seiji Takenobu, Mihama-ku (JP)

(73) Assignee: Kawasaki Microelectronics, Inc., Chiba (JP)

( * ) Notice: Subject to any disclaimer, the term of this patent is extended or adjusted under 35 U.S.C. 154(b) by 426 days.

(21) Appl. No.: 11/285,170

(22) Filed: Nov. 23, 2005

(65) Prior Publication Data

US 2006/0112207 A1    May 25, 2006

(30) Foreign Application Priority Data

Nov. 25, 2004    (JP)    ............................. 2004-340731

(51) Int. Cl.
*G06F 5/06*    (2006.01)
*G06F 13/00*    (2006.01)
*G06F 15/177*    (2006.01)

(52) U.S. Cl. ........................ 713/600; 710/110; 709/220

(58) Field of Classification Search .................. 713/600
See application file for complete search history.

(56) References Cited

U.S. PATENT DOCUMENTS 5,712,983 A * 1/1998 Vergnaud et al. ............ 709/250
5,805,837 A * 9/1998 Hoover et al. ............... 710/110
5,809,111 A * 9/1998 Matthews ..................... 379/31
6,154,859 A * 11/2000 Norizuki et al. .............. 714/47
7,024,257 B2 * 4/2006 Pearce et al. .................. 700/72

FOREIGN PATENT DOCUMENTS

JP    11-167560    6/1999

OTHER PUBLICATIONS

Design Wave Magazine, Dec. 2003, pp. 47-57, Fig. 3.

* cited by examiner

*Primary Examiner*—Suresh K Suryawanshi
(74) *Attorney, Agent, or Firm*—Oliff & Berridge, PLC

(57) ABSTRACT

A data transfer apparatus includes at least one master and a plurality of slaves connected by a ring-connection bus, and a controller having a master port and slave ports connected to the corresponding master and slaves, respectively. In such a ring-like structure, a large amount of data can be transferred efficiently, and even if data continuously flows on the bus, data transfer is performed in a master/slave structure, thereby reducing the overall data transfer time.

11 Claims, 5 Drawing Sheets

RELATED ART

DATA TRANSFER APPARATUS

BACKGROUND

The present invention relates to a data transfer apparatus connected to a bus through which data passes so as to send and receive data to and from the bus.

A data transfer apparatus having a so-called point-to-point connection bus structure is known (for example, see *Design Wave Magazine*, December 2003, page 49, FIG. 3). In this data transfer apparatus, a plurality of masters and a plurality of slaves are connected to a bus through which data passes, and if more than one master contend for a right to use the bus (hereinafter referred to as a "bus use right"), an arbiter arbitrates between the masters so that the master having the highest priority obtains the bus right. The master that has the bus use right transfers data to a specific slave. Upon completing the data transfer, the master releases the bus right, and the master having the second highest priority then obtains the bus use right.

FIG. 5 is an enlarged diagram illustrating a controller 100 for use in a known data transfer apparatus having a point-to-point connection bus structure. The controller 100 shown in FIG. 5 includes multiplexers (Mux) 111 and 112, an arbiter 113, an address decoder 114, and data buses 115 and 116. The controller 100 also includes master ports 101_1a, 101_2a, 101_3a, and 101_4a corresponding to four masters (not shown) and slave ports 102_1a, 102_2a, 102_3a, and 102_4a corresponding to four slaves (not shown).

It is now assumed that, among the four masters, the master corresponding to the master port 101_1a has a bus use right. When writing data from this master into the slave corresponding to the slave port 102_3a, the multiplexer 111 selects write data WData from the master port 101_1a according to a signal from the arbiter 113 to instruct the multiplexer 111 to select the master corresponding to the master port 101_1a. The selected data WData is then transferred to the bus 115 and is further transferred to the slave corresponding to the slave port 102_3a. In this manner, data is written from a certain master into a certain slave.

Conversely, if the master corresponding to the master port 101_1a reads data from the slave corresponding to the slave port 102_3a, the multiplexer 112 selects read data RData from the slave port 102_3a according to a signal from the address decoder 114 to instruct the multiplexer 112 to select the slave corresponding to the slave port 102_3a. The selected read data RData is then transferred to the bus 116 and is further transferred to the master corresponding to the master port 101_1a In this manner, data is read out from a specific slave to a specific master.

Another type of data transfer apparatus, a data transfer apparatus having a ring-connection bus structure in which a plurality of masters and a plurality of slaves are connected to one bus in a ring-like form, is also known (for example, see Japanese Unexamined Patent Application Publication No. 11-167560). In this type of data transfer apparatus, data can be simultaneously transferred between a plurality of masters and a plurality of slaves. Additionally, instead of obtaining or releasing a bus use right described above, a master can start data transfer with a slave at any time when the bus is available.

In the above-described data transfer apparatus having a point-to-point connection bus structure, because there is only one master that can transfer data on the bus, the data transfer efficiency is very low when the bus contention occurs frequently. Also, in addition to the time required for data transfer, more time (time lag) for delivering a bus use right from one master to another master is needed, thereby wasting the time.

In the data transfer apparatus having a ring-connection bus structure, data continuously flows into the bus during the data transfer. Accordingly, if the master, which only serves the function of relaying data, attempts to transfer data generated by the master itself, bus contention occurs between such data and the relaying data, and the master cannot start transferring the data generated by the master. Thus, when transferring the data generated by the master itself, it is necessary to interrupt the transfer operation of the relaying data. Additionally, as the number of masters and slaves increases, the ring becomes larger, thereby increasing the overall time required for data transfer.

SUMMARY

Accordingly, in view of the above background, it is an object of the present invention to provide a data transfer apparatus that can reduce the time required for data transfer while increasing the data transfer efficiency.

In order to achieve the above object, according to one exemplary aspect of the present invention, a data transfer apparatus connected to a bus through which data passes so as to transmit or receive data to or from the bus is provided. The exemplary data transfer apparatus includes a first reception port that receives data from a ring-connection bus, a first transmission port that transmits data to the ring-connection bus, a second reception port that receives data from a master/slave bus, and a second transmission port that transmits data to the master/slave bus.

The aforementioned exemplary data transfer apparatus has a ring-like structure including the first reception port and the first transmission port. Accordingly, a plurality of masters can simultaneously transfer data on the ring-connection bus, unlike a conventional data transfer apparatus having a point-to-point connection bus structure in which only one master performs the data transfer. Additionally, additional time for delivering a bus use right is not required. Thus, the data transfer efficiency is enhanced. The aforementioned exemplary data transfer apparatus has a master/slave structure including the second reception port and the second transmission port. Accordingly, even if data continuously flows on a ring-connection bus during data transfer, the master which serves the function of relaying such data can start transferring data from the master by using the master/slave bus without interrupting the continuous data transfer operation, unlike a conventional data transfer apparatus having a ring-connection bus structure. Also, even if the number of masters and slaves is increased, the time required for data transfer is not increased, thereby reducing the overall data transfer time. As described above, a large amount of data can be efficiently transferred in a ring-connection structure, and even if data continuously flows into the bus, the overall data transfer time can be reduced by performing data transfer in a master/slave structure.

The exemplary data transfer apparatus may preferably further include a selector that selects between data received from the first reception port and data generated by the data transfer apparatus to deliver the selected data to the first transmission port.

With this arrangement, the data transfer efficiency can be further enhanced.

According to an aspect of the data transfer apparatus of the present invention, the data transfer time can be reduced while enhancing the data transfer efficiency.

DETAILED DESCRIPTION OF EMBODIMENTS

Various exemplary embodiments are described in detail below with reference to the accompanying drawings through illustration of preferred embodiments.

Figure 1:
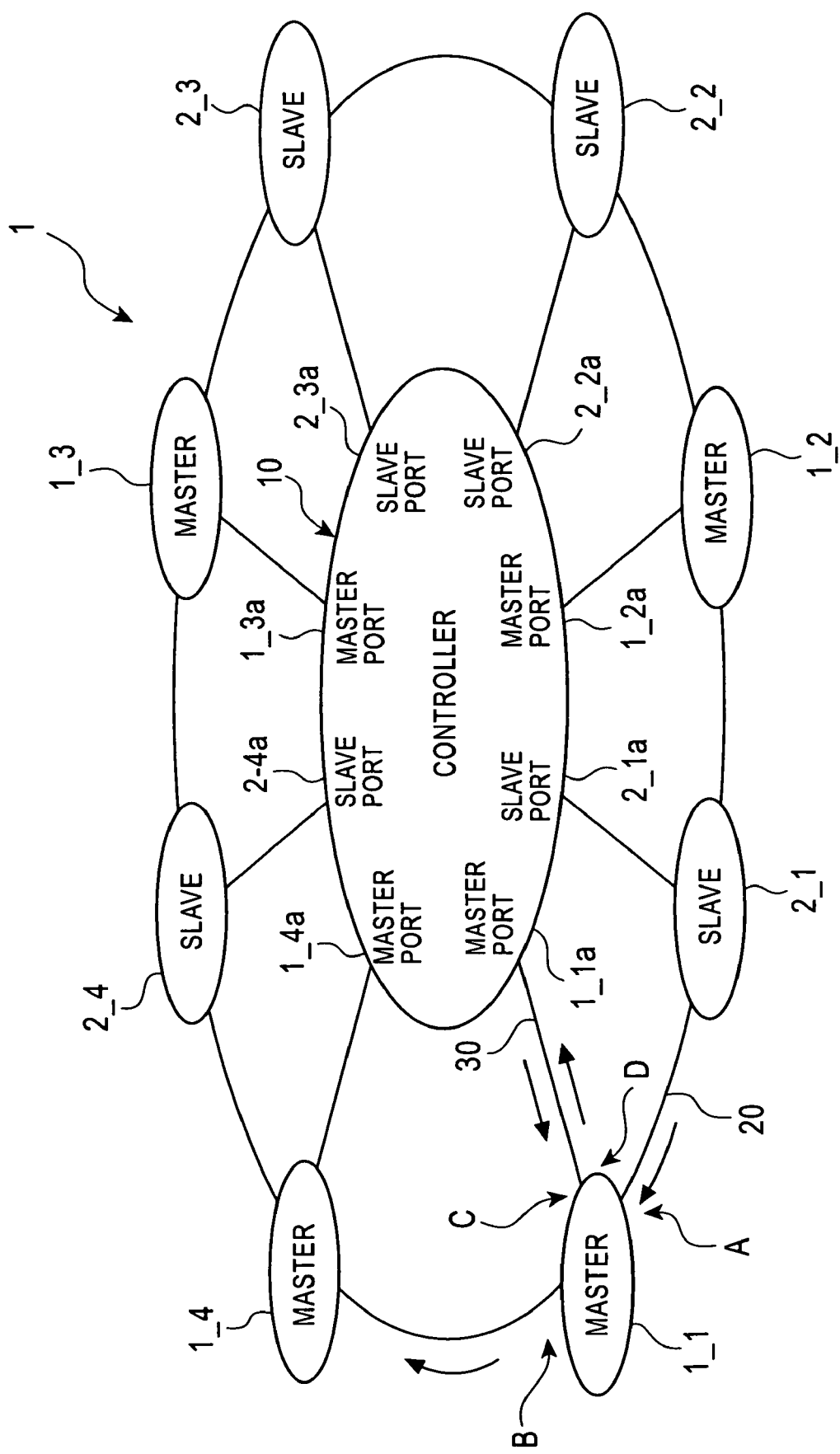
FIG. 1 is a schematic diagram illustrating the configuration of a data transfer apparatus according to a first exemplary embodiment.

FIG. 1 illustrates the configuration of a data transfer apparatus 1 according to an exemplary first embodiment.

The exemplary data transfer apparatus 1 shown in FIG. 1 includes masters 1_1, 1_2, 1_3, and 1_4, slaves 2_1, 2_2, 2_3, and 2_4, and a controller 10. The masters 1_1, 1_2, 1_3, and 1_4 and the slaves 2_1, 2_2, 2_3, and 2_4 are connected to each other by a ring-connection bus 20.

According to various exemplary embodiments, the controller 10 includes master ports 1_1a, 1_2a, 1_3a, and 1_4a corresponding to the masters 1_1, 1_2, 1_3, and 1_4, respectively, and slave ports 2_1a, 2_2a, 2_3a, and 2_4a corresponding to the slaves 2_1, 2_2, 2_3, and 2_4, respectively. The masters 1_1, 1_2, 1_3, and 1_4 are connected to the master ports 1_1a, 1_2a, 1_3a, and 1_4a, respectively, by direct buses 30 (corresponding to an example of a master/slave bus in the present invention). The slaves 2_1, 2_2, 2_3, and 2_4 are connected to the slave ports 2_1a, 2_2a, 2_3a, and 2_4a, respectively, by the direct buses 30. The master ports 1_1a, 1_2a, 1_3a, and 1_4a and the slave ports 2_1a, 2_2a, 2_3a, and 2_4a serve as both the second reception port and the second transmission port.

Figure 2:
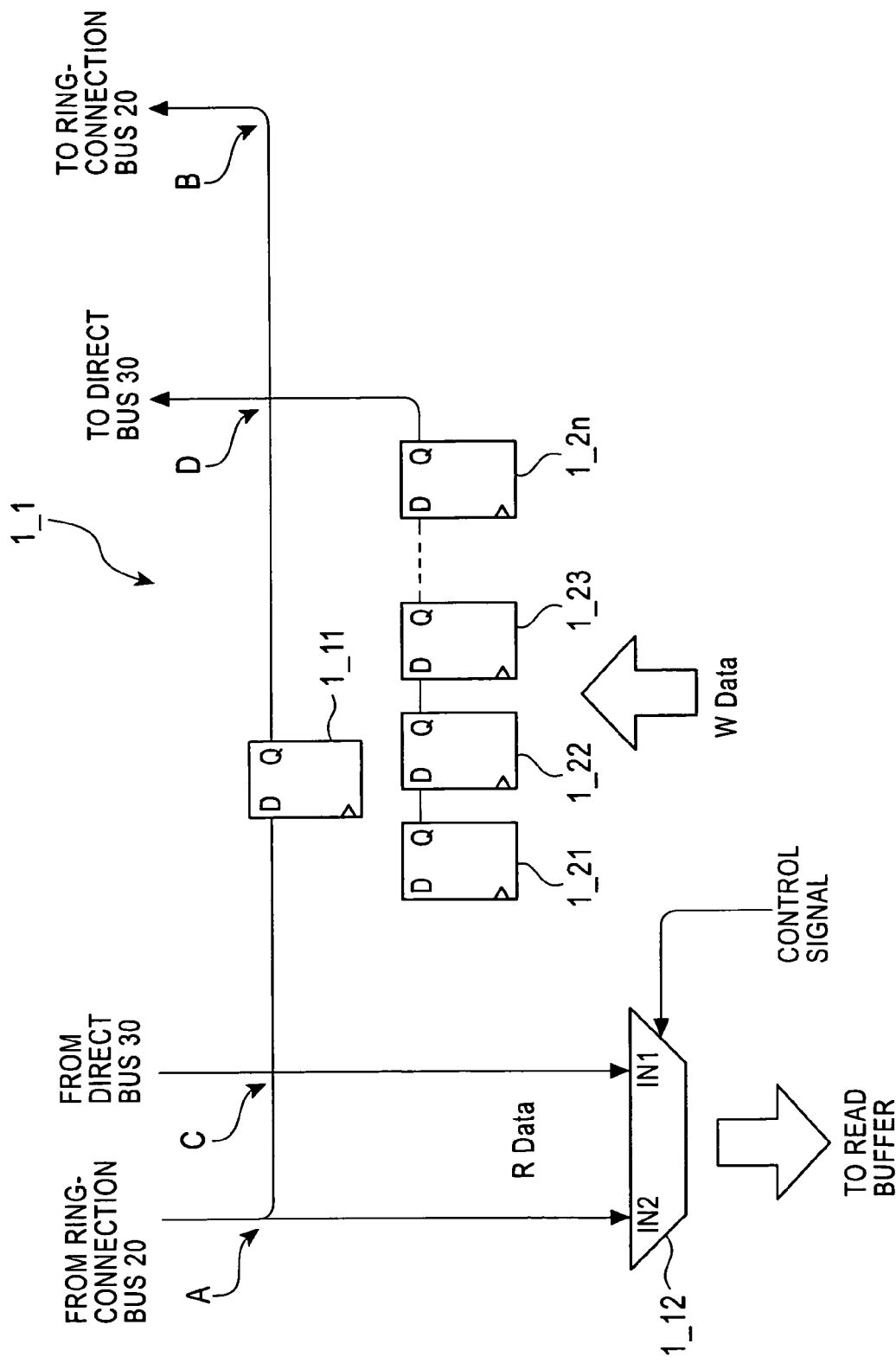
FIG. 2 is a schematic diagram illustrating the configuration of one of the masters shown in FIG. 1.

FIG. 2 is a schematic diagram illustrating the configuration of the master 1_1 shown in FIG. 1. The same configuration applies to the masters 1_2, 1_3, and 1_4.

The master 1_1 shown in FIG. 2 includes a flip-flop 1_11 having a data input terminal D (corresponding to an example of a first reception port in the present invention) for receiving reception data from the ring-connection bus 20 via node A and a data output terminal Q (corresponding to an example of a first transmission port in the present invention) for outputting transmission data to the ring-connection bus 20 via node B.

The master 1_1 may also include a selector 1_12 having input terminals IN1 and IN2. Data RData from the master port 1_1a, which serves as the second transmission port, is input into the input terminal IN1 of the selector 1_12 via the direct bus 30 and node C. Data RData from the ring-connection bus 20 is input into the input terminal IN2 of the selector 1_12 via node A.

The master 1_1 also includes a write buffer formed of flip-flops 1_21, 1_22, 1_23, ..., 1_2n into which data WData from an internal circuit is written. Data output from a data output terminal Q of the flip-flop 1_2n is input into the master port 1_1a, which serves as the second reception port, via node D and the direct bus 30.

The master 1_2 may, for example, transfer data to the slave 2_4 through the ring-connection bus 20 in the exemplary data transfer apparatus 1 shown in FIG. 1. In this case, data from the master 1_2 is input via the slave 2_1 into the data input terminal D of the flip-flop 1_11 disposed in the master 1_1 shown in FIG. 2. The data RData input into the flip-flop 1_11 is output to the ring-connection bus 20 from the output terminal Q. The output data RData is then input into the slave 2_4 via the master 1_4. While the master 1_2 is transferring data to the slave 2_4 on the ring-connection bus 20, another master, for example, the master 1_3, can transfer data to the slave 2_3 on the ring-connection bus 20. In the data transfer apparatus 1 of the first embodiment, unlike a known data transfer apparatus having a point-to-point connection bus structure in which only one master can perform data transfer, a plurality of masters can perform data transfer at the same time. Moreover, additional time for delivering a bus use right is not required. Thus, the data transfer efficiency is increased.

In the data transfer apparatus 1 of the first embodiment, even while the master 1_2 is continuously transferring data to the slave 2_4 on the ring -connection bus 20, the master 1_1, which serves the function of relaying the data to the slave 2_4, can perform data transfer with, for example, the slave 2_1, without interrupting the continuous transfer operation. This process is described in detail below.

When writing data WData from the master 1_1 into the slave 2_1, the data WData is first stored in the flip-flops 1_21, 1_22, 1_23, ..., and 1_2n from the internal circuit of the master 1_1. The data WData is then transferred to the direct bus 30 from the data output terminal Q of the flip-flop 1_2n and is further transferred to the slave 2_1 via the master port 1_1a and the slave port 2_1a of the controller 10. In this manner, data is written from the master 1_1 into the slave 2_1.

When reading data from the slave 2_1 into the master 1_1, data from the slave 2_1 is input into the input terminal IN2 of the selector 1_12 forming the master 1_1 in a path of the direct bus 30→the slave port 2_1a→the master port 1_1a→the direct bus 30. In the selector 1_12, the data RData from the direct bus 30 is selected according to a control signal instructing the selector 1_12 to select the slave 2_1 and is input into a read buffer (not shown). In this manner, data from the slave 2_1 is read by the master 1_1. As described above, even while data continuously flows into the ring-connection bus 20, the master 1_1, which serves the function of relaying the continuous data, can transfer data from the master 1_1 to the slave 2_1 without interrupting the continuous data transfer operation. Thus, the time for transferring data is reduced.

Figure 3:
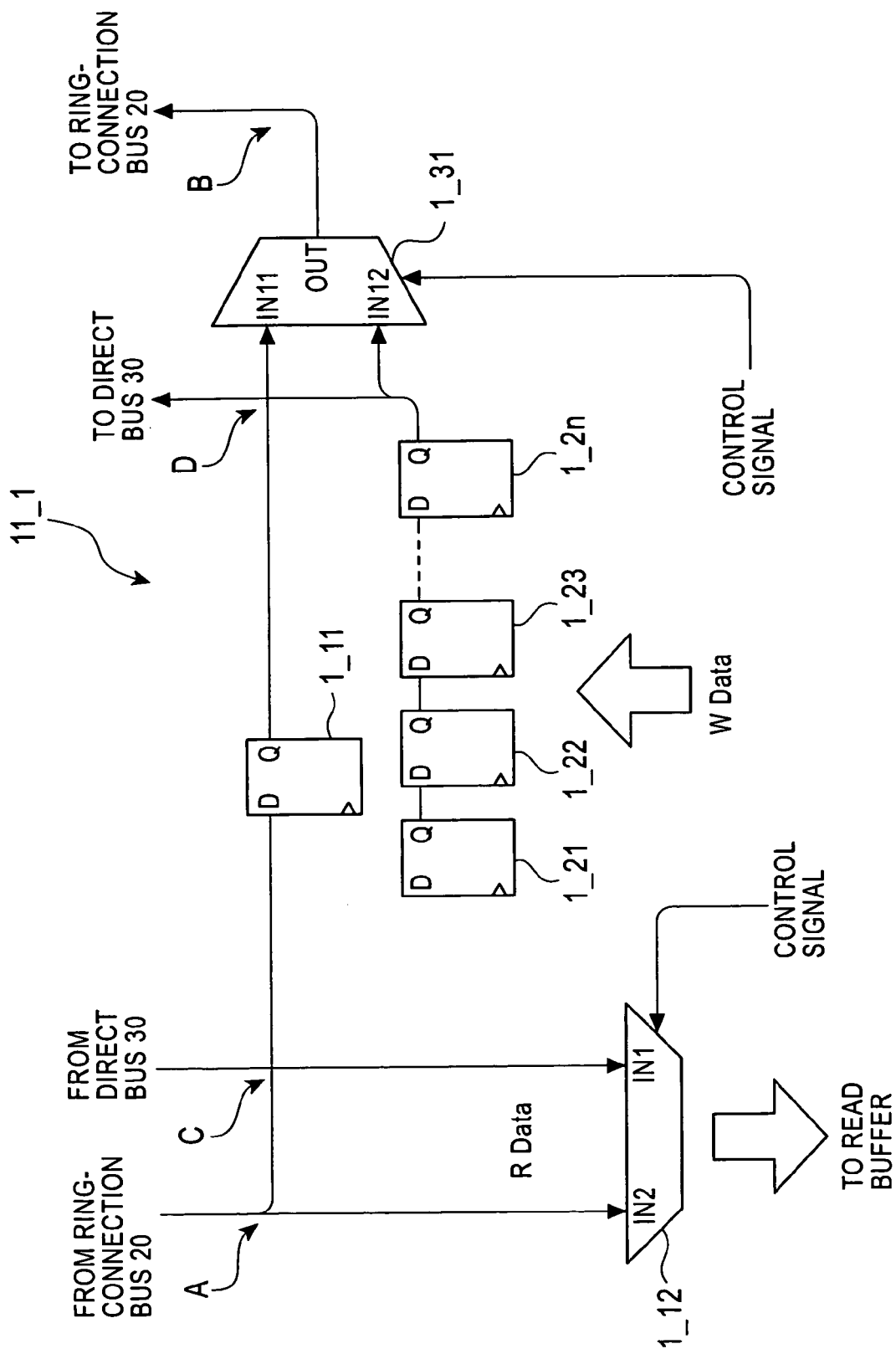
FIG. 3 is a schematic diagram illustrating a master disposed in a data transfer apparatus according to a second exemplary embodiment.

FIG. 3 is a schematic diagram illustrating a master 11_1 disposed in a data transfer apparatus according to an exemplary second embodiment.

The data transfer apparatus of the second embodiment is not shown since it is similar to the data transfer apparatus 1 shown in FIG. 1, except that the master 11_1 shown in FIG. 3 is substituted to the masters 1_1, 1_2, 1_3, or 1_4. The configuration of the master 11_1 shown in FIG. 3 is described below.

The master 11_1 shown in FIG. 3 is different from the master 1_1 shown in FIG. 2 in that an exemplary selector 1_31 is added. Read data RData from the ring -connection bus 20 is input into an input terminal IN11 of the selector 1_31 via the node A and the flip-flop 1_11. Write data WData (corresponding to data generated by the master 11_1 in the present invention) written into the flip-flops 1_21, 1_22, 1_23 ..., and 1_2n is input into an input terminal IN12 of the selector 1_31. The selector 1_31 selects the read data RData from the ring-connection bus 20 or the write data WData written into the flip-flops 1_21, 1_22, 1_23, ..., and 1_2n according to a control signal, and outputs the selected data from a data output terminal OUT (corresponding to another example of the first transmission port in the present invention) of the selector 1_31 and transfers it to the ring-connection bus 20 via the node B.

In the data transfer apparatus of the second exemplary embodiment, since the master 1_11 is provided with the selector 1_31, the following advantages are provided. If the master 1_11 is unable to transfer data because the ring-connection bus 20 is occupied with other data, then read data RData, that is input into the input terminal IN2 of the selector 1_12, is temporarily stored in the read buffer, and is written into the flip-flops 1_21, 1_22, 1_23, . . . , and 1_2n as write data WData. Then, when the ring-connection bus 20 becomes available to transfer data, the buffered data is transferred to the ring-connection bus 20 via the input terminal IN12 of the selector 1_31. On the other hand, if the ring-connection bus 20 is not occupied with data, then read data RData, that is input into the input terminal IN11 of the selector 1_31, is transferred to the ring-connection bus 20. With this configuration, data transfer can be performed more efficiently. If the master 11_1 is unable to transfer data of the master 11_1 because the ring-connection bus 20 is busy with other data, the data on the ring-connection connection bus 20 may be temporarily stored in the read buffer, thereby enabling the master 11_1 to transfer the data of the master 11_1 to the ring-connection bus 20.

Figure 4:
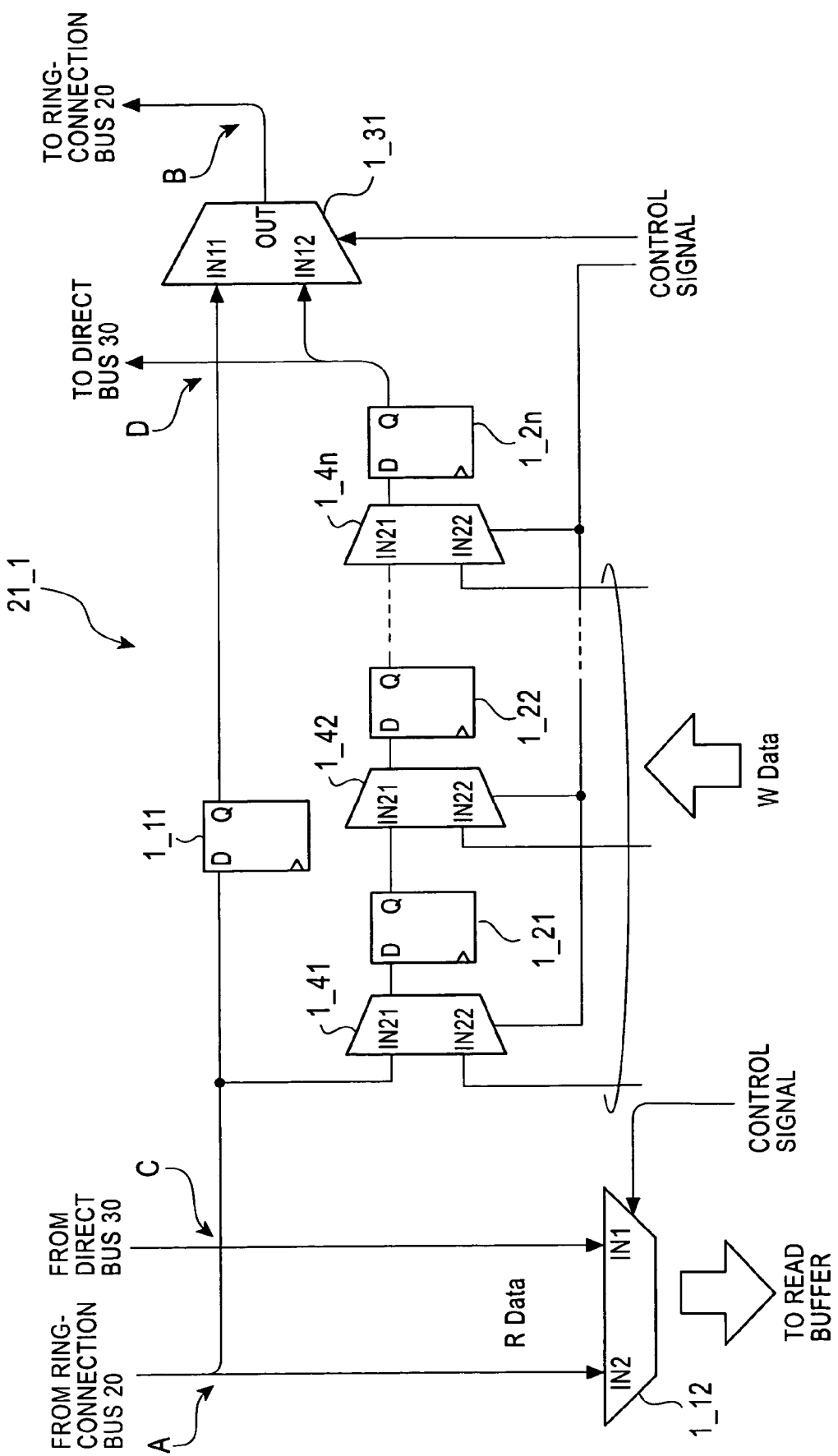
FIG. 4 is a schematic diagram illustrating a master disposed in a data transfer apparatus according to a third exemplary embodiment.
Figure 5:
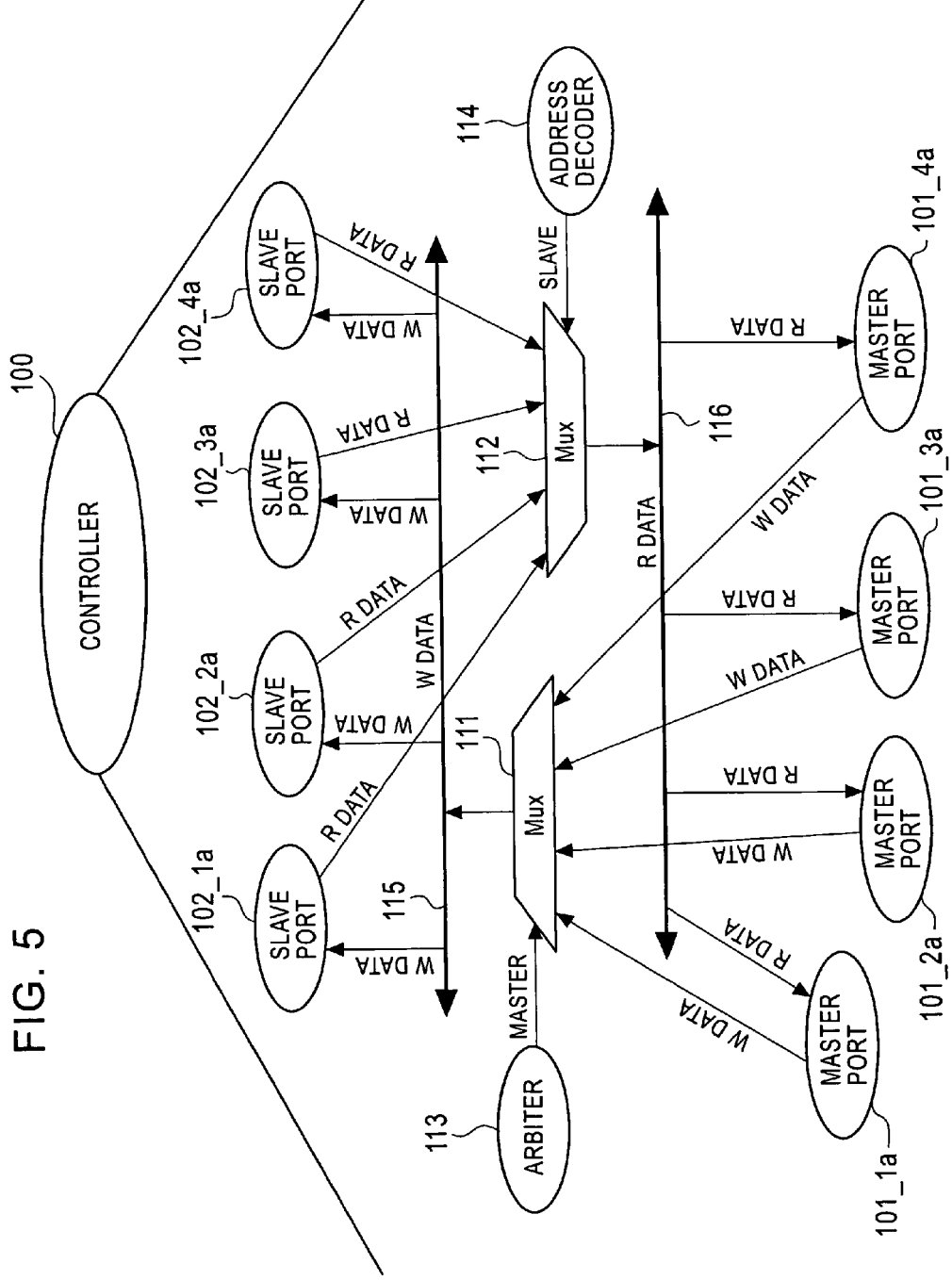
FIG. 5 is an enlarged diagram illustrating a controller disposed in a related data transfer apparatus having a point-to-point connection bus structure.

FIG. 4 is a schematic diagram illustrating a master 21_1 disposed in a data transfer apparatus according to a third exemplary embodiment.

The data transfer apparatus of the third embodiment is not shown since it is similar to the data transfer apparatus 1 shown in FIG. 1, except that the master 21_1 shown in FIG. 4 is substituted to the master 1_1, 1_2, 1_3, or 1_4. The configuration of the master 21_1 shown in FIG. 4 is described below.

The master 21_1 shown in FIG. 4 is different from the master 11_1 shown in FIG. 3 in that selectors 1_41, 1_42, . . . , and 1_4n are added. Data RData from the ring-connection bus 20 is input into an input terminal IN21 of the selector 1_41 via the node A, and the outputs from the flip-flops 1_21, 1_22, and so on, are input into the input terminals IN21 of the subsequent selectors 1_42, . . . , and 1_4n, respectively. Then, the write data WData from the internal circuit is input into input terminals IN22 of the selectors 1_41, 1_42, and 1_4n. Finally, the selectors 1_41, 1_42, . . . , and 1_4n select between data RData from the ring-connection bus 20 and write data WData from the internal circuit according to a control signal, and transfers the selected data to the subsequent flip-flops. As discussed above, the selector 1_31 selects between read data RData from the ring-connection bus 20 and write data WData written into the flip-flops 1_21, 1_22, 1_23 . . . , and 1_2n according to a control signal, and outputs the selected data from the output terminal OUT of the selector 1_31 to the ring-connection bus 20 via the node B.

In the exemplary data transfer apparatus of the third embodiment, since the master 21_1 is provided with the selectors 1_41, 1_42, . . . , and 1_4n, and the selector 1_31, even if the ring-connection bus 20 is busy, data can be stored in the write buffer of the master 21_1 and is then transferred to the ring-connection bus 20, thereby making it possible to sequentially transfer data stored in the write buffer without the need to store read data RData in the read buffer. As in the second embodiment, if the master 21_1 is unable to transfer data because the ring-connection bus 20 is busy with other data, the data on the ring-connection bus 20 may be temporarily stored in the read buffer, thereby enabling the master 21_1 to transfer the data of the master 21_1 to the ring-connection bus 20.

While the exemplary data transfer apparatus is described in detail through the foregoing embodiments, it is to be understood that the invention is not limited to the disclosed exemplary embodiments. Various improvements or modifications can be made without departing from the spirit of the invention.

What is claimed is:

1. A data transfer apparatus that is coupled to a bus through which data passes so as to transmit or receive transmission data to or from the bus, comprising:
a first reception port that receives transmission data from a ring-connection bus;
a first transmission port that transmits transmission data to the ring-connection bus;
a second reception port that receives transmission data from a master/slave bus;
a second transmission port that transmits transmission data to the master/slave bus; and
a selector that selects between transmission data received from the first reception port and transmission data generated by the data transfer apparatus to deliver the selected transmission data to the first transmission port.

2. A data transfer apparatus comprising:
a plurality of masters;
a plurality of slaves connected to the plurality of masters by a ring-connection bus; and
a controller including a plurality of master ports connected to the corresponding masters and a plurality of slave ports connected to the corresponding slaves,
wherein each one of the plurality of masters includes a first selector for selectively receiving transmission data from the ring-connection bus or transmission data from a master/slave bus.

3. The data transfer apparatus according to claim 2, wherein each one of the plurality of masters includes a flip-flop for receiving transmission data from the ring-connection bus and for outputting the received transmission data to the ring-connection bus.

4. The data transfer apparatus according to claim 2, wherein each one of the plurality of masters includes a plurality of flip-flops for outputting transmission data generated by the master to the master/slave bus at a predetermined time.

5. The data transfer apparatus according to claim 3, wherein each one of the plurality of masters includes a plurality of flip-flops for outputting transmission data generated by the master to the master/slave bus at a predetermined time.

6. The data transfer apparatus according to claim 4, wherein each one of the plurality of masters includes a second selector for selecting between transmission data from the ring-connection bus and transmission data generated by the master to output the selected transmission data to the ring-connection bus.

7. The data transfer apparatus according to claim 5, wherein each one of the plurality of masters includes a second selector for selecting between transmission data from the ring-connection bus and transmission data generated by the master to output the selected transmission data to the ring-connection bus.

8. The data transfer apparatus according to claim 6, wherein the plurality of masters independently transfer transmission data between at least one of the ring-connection buses, the master/slave buses, and the ring-connection bus and the master/slave bus.

9. The data transfer apparatus according to claim 7, wherein the plurality of masters independently transfer transmission data between at least one of the ring-connection buses, the master/slave buses, and the ring-connection bus and the master/slave bus.

10. The data transfer apparatus according to claim 6, wherein each one of the plurality of masters inputs transmission data from the ring-connection bus to the plurality of flip-flops and outputs the transmission data to the ring-connection bus via the second selector at a predetermined time.

11. The data transfer apparatus according to claim 7, wherein each one of the plurality of masters inputs transmission data from the ring-connection bus to the plurality of flip-flops and outputs the transmission data to the ring-connection bus via the second selector at a predetermined time.

* * * * *